United States Patent
Gokhale et al.

(10) Patent No.: US 10,860,297 B2
(45) Date of Patent: Dec. 8, 2020

(54) METHODS FOR EFFICIENTLY MANAGING DATA ANALYTICS USING COMPLEX DEPENDENCY PIPELINES AND DEVICES THEREOF

(71) Applicant: JPMorgan Chase Bank, N.A., New York, NY (US)

(72) Inventors: Jayant V. Gokhale, Edison, NJ (US); Suresh Devaravar, Hillsborough Township, NJ (US); Benjamin F. Sylvester, III, Darien, CT (US); Shailesh Nayak, Princeton, NJ (US); Tarun Chillara, Glen Oaks, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/363,653

(22) Filed: Mar. 25, 2019

(65) Prior Publication Data

US 2019/0303106 A1 Oct. 3, 2019

Related U.S. Application Data

(60) Provisional application No. 62/649,207, filed on Mar. 28, 2018.

(51) Int. Cl.
*G06F 8/20* (2018.01)
*G06F 16/903* (2019.01)
(Continued)

(52) U.S. Cl.
CPC .............. *G06F 8/22* (2013.01); *G06F 16/258* (2019.01); *G06F 16/9024* (2019.01); *G06F 16/90335* (2019.01)

(58) Field of Classification Search
CPC ...... G06F 8/22; G06F 16/258; G06F 16/2465; G06F 16/9024; G06F 16/90335
(Continued)

(56) References Cited

U.S. PATENT DOCUMENTS

| 6,681,221 B1 * | 1/2004 | Jacobs ............... G06F 16/9024 |
| 7,926,032 B2 * | 4/2011 | Beisiegel .................. G06F 8/51 717/122 |

(Continued)

OTHER PUBLICATIONS

Dayarathna et al., "Automatic optimization of stream programs via source program operator graph transformations," Springer, 2013, 57pg. (Year: 2013).*

(Continued)

*Primary Examiner* — Ryan D. Coyer
(74) *Attorney, Agent, or Firm* — Greenblum & Bernstein, P.L.C.

(57) ABSTRACT

Methods and systems for managing data analytics are provided. The methods and systems entail obtaining a configuration file that includes steps. Each step includes at least one parameter that identifies a source of input data, a transformation that corresponds to business logic to be applied to the input data, and/or a sink of output data resulting from a transformation to the input data. A directed acyclic graph is generated based on the configuration file. The directed acyclic graph is then executed by invoking an application programming interface (API) of a data transformation engine to apply the transformations to the input data, and then returning an indication of completion to a source of the configuration file.

20 Claims, 6 Drawing Sheets

(51) Int. Cl.
*G06F 16/25* (2019.01)
*G06F 16/901* (2019.01)

(58) Field of Classification Search
USPC .......................................................... 717/106
See application file for complete search history.

(56) References Cited

U.S. PATENT DOCUMENTS

| | | | | |
|---|---|---|---|---|
| 2007/0271548 | A1* | 11/2007 | Chawla | A47B 23/002 717/106 |
| 2015/0081701 | A1* | 3/2015 | Lerios | H04L 43/045 707/736 |
| 2018/0075125 | A1* | 3/2018 | Stiel | G06F 16/278 |
| 2019/0121810 | A1* | 4/2019 | Zhuang | G06F 16/254 |

OTHER PUBLICATIONS

Vavilapalli et al., "Apache Hadoop YARN: Yet Another Resource Negotiator," ACM, 2013, 16pg. (Year: 2013).*

* cited by examiner

```
SparkConf conf = new SparkConf();
conf.setAppName("Test App");
conf.setMaster("master");

SparkContext sc = new SparkContext(conf);
HiveContext sqlc = new HiveContext(sc);

JavaRDD<String> textFile = sc.textFile("hdfs://...");
@SuppressWarnings("serial")
JavaRDD<Row> rowRDD = textFile.map(
  new Function<String, Row>() {
    public Row call(String line) throws Exception {
      return RowFactory.create(line);
    }
});

List<StructField> fields = new ArrayList<StructField>();
fields.add(DataTypes.createStructField("line", DataTypes.StringType, true));
StructType schema = DataTypes.createStructType(fields);

DataFrame df = sqlc.createDataFrame(rowRDD, schema);

DataFrame result = df.sqlContext()
  .sql("select a , count(*) ct from tab where b >300 group by c");

SaveMode saveMode = SaveMode.valueOf("overwrite");

DataFrameWriter writer = result.write();
writer.mode(saveMode).saveAsTable("output_table");

sc.stop();
```

Boilerplate Code Fragment

```
step.s1.source=hdfs
step.s1.source.format=text
step.s1.source.path=hdfs/data/location
step.s1.source.schema.file=hdfs/data/schema/data.schema step.s2.dependencies=s1
step.s2.source=sql
step.s2.source.query.file=hdfs/data/location/s1.sql
step.s2.sink=hive
step.s2.sink.table=database.output_table
step.s2.sink.mode=append
```

Configuration File

FIG. 5

Directed Acyclic Graph

METHODS FOR EFFICIENTLY MANAGING DATA ANALYTICS USING COMPLEX DEPENDENCY PIPELINES AND DEVICES THEREOF

CROSS-REFERENCE TO RELATED APPLICATIONS

This application claims the benefit of U.S. Provisional Patent Application Ser. No. 62/649,207, filed Mar. 28, 2018, which is hereby incorporated by reference in its entirety.

BACKGROUND

1. Field of the Disclosure

This technology generally relates to systems and methods for performing and managing data analytics tasks, and more particularly to optimizing a process for generating code to perform data analytics tasks.

2. Background Information

Enterprises are increasingly leveraging data analytics, especially big data analytics, which involve large quantities of data. Conventional big data transformation engines, such as, for example, Apache Spark, utilize cluster computing frameworks to perform large scale data processing tasks relatively efficiently. However, software developers current utilize a significant amount of time and labor resources for writing relatively boilerplate code for various jobs to be executed by big data transformation engines.

Further, integrating disparate data sources and sinks, orchestrating tasks, and pipelining complex transformations may be difficult, based on currently available technology. Still further, a significant amount of unit testing is often required during development, and significant code changes may be required to upgrade a version of a big data transformation engine. As a result, fewer resources are available to focus on the business logic associated with the big data analytics jobs, including resources that are required with respect to functional testing of the business logic.

In view of the above, there is an unmet need for systems and methods for optimizing a process for generating code to perform data analytics tasks.

SUMMARY

The present disclosure, through one or more of its various aspects, embodiments, and/or specific features or sub-components, provides, inter alia, various systems, servers, devices, methods, media, programs, and platforms for performing and managing data analytics tasks. The various aspects, embodiments, features, and/or sub-components provide optimized processes of performing and managing data analytics tasks based on a configuration file that specifies data sources, transformations, and sinks and the execution of a directed acyclic graph that is generated by using the configuration file.

According to an aspect of the present disclosure, a method for performing a data analytics task is provided. The method is implemented by at least one data analytics device that includes a memory and a processor. The method includes obtaining a configuration file that includes a plurality of steps. Each step includes at least one parameter that identifies at least one from among at least one source of input data, at least one transformation to be applied to the input data, and at least one sink of output data resulting from an application of the at least one transformation to the input data. The at least one transformation corresponds to a predetermined set of business logic. At least one step depends from at least one other step. The method further includes: using the configuration file to generate a directed acyclic graph (DAG) based on the plurality of steps; and executing the DAG by invoking an application programming interface (API) of the at least one data analytics device to apply the at least one transformation to the input data, and returning an indication of completion to a source of the configuration file.

The at least one source of the input data may include at least one from among an Apache Hadoop Distributed File System (HDFS), an Apache Hive data warehouse, an Apache HBase, and a Relational Database Management System (RDBMS).

The at least one sink of the output data may include at least one from among an Apache Hadoop Distributed File System (HDFS), an Apache Hive data warehouse, an Apache HBase, and a Relational Database Management System (RDBMS).

The at least one transformation may include at least one from among a transformation applied with Structured Query Language, a transformation applied with Java, and a transformation applied with Scala.

At least one from among the plurality of steps may include at least one feature from among a plurality of features consisting of caching, partitioning, a Structured Query Language user-defined function (SQL UDF), looping, parameterizing, data versioning, and dependency.

The method of claim 1, wherein the executing the DAG may include determining a step type for a particular step. The step type may include at least one from among a regular step, a conditional step, and a loop step.

When the particular step is determined to be a regular step, the executing the DAG may further include extracting at least one parameterized value from a portion of the configuration file that corresponds to the particular step.

When the particular step is determined to be a conditional step, the executing the DAG may further include determining whether the particular step is to be executed based on a defined predicate that is included in a portion of the configuration file that corresponds to the particular step.

When the particular step is determined to be a loop step, the executing the DAG may further include extracting at least one loop value from a portion of the configuration file that corresponds to the particular step.

When the particular step is determined to be a loop step, the executing the DAG may further include extracting at least one loop value from a portion of the configuration file that corresponds to a step that immediately precedes the particular step.

According to another aspect of the present disclosure, a device configured to implement a method for performing a data analytics task is provided. The device includes a processor, a memory, and a communication interface coupled to each of the processor and the memory. The processor is configured to obtain a configuration file that includes a plurality of steps. Each step includes at least one parameter that identifies at least one from among at least one source of input data, at least one transformation to be applied to the input data, and at least one sink of output data resulting from an application of the at least one transformation to the input data. The at least one transformation corresponds to a predetermined set of business logic. At least a second step from among the plurality of steps depends from at least a first step from among the plurality of steps. The processor is further configured to: use the configuration file to generate a directed acyclic graph (DAG) based on the plurality of steps; and execute the DAG by invoking an application programming interface (API) of the device to apply the at least one transformation to the input data, and returning an indication of completion to a source of the configuration file.

The at least one source of the input data may include at least one from among an Apache Hadoop Distributed File System (HDFS), an Apache Hive data warehouse, an Apache HBase, and a Relational Database Management System (RDBMS).

The at least one sink of the output data may include at least one from among an Apache Hadoop Distributed File System (HDFS), an Apache Hive data warehouse, an Apache HBase, and a Relational Database Management System (RDBMS).

The at least one transformation may include at least one from among a transformation applied with Structured Query Language, a transformation applied with Java, and a transformation applied with Scala.

At least one from among the plurality of steps may include at least one feature from among a plurality of features consisting of caching, partitioning, a Structured Query Language user-defined function (SQL UDF), looping, parameterizing, data versioning, and dependency.

The processor may be further configured to execute the DAG by determining a step type for a particular step. The step type may include at least one from among a regular step, a conditional step, and a loop step.

When the particular step is determined to be a regular step, the processor may be further configured to extract at least one parameterized value from a portion of the configuration file that corresponds to the particular step.

When the particular step is determined to be a conditional step, the processor may be further configured to determine whether the particular step is to be executed based on a defined predicate that is included in a portion of the configuration file that corresponds to the particular step.

When the particular step is determined to be a loop step, the processor may be further configured to extract at least one loop value from a portion of the configuration file that corresponds to the particular step.

When the particular step is determined to be a loop step, the processor may be further configured to extract at least one loop value from a portion of the configuration file that corresponds to a step that immediately precedes the particular step.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 illustrates a code fragment and a corresponding configuration file to be used in the process of FIG. 4, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
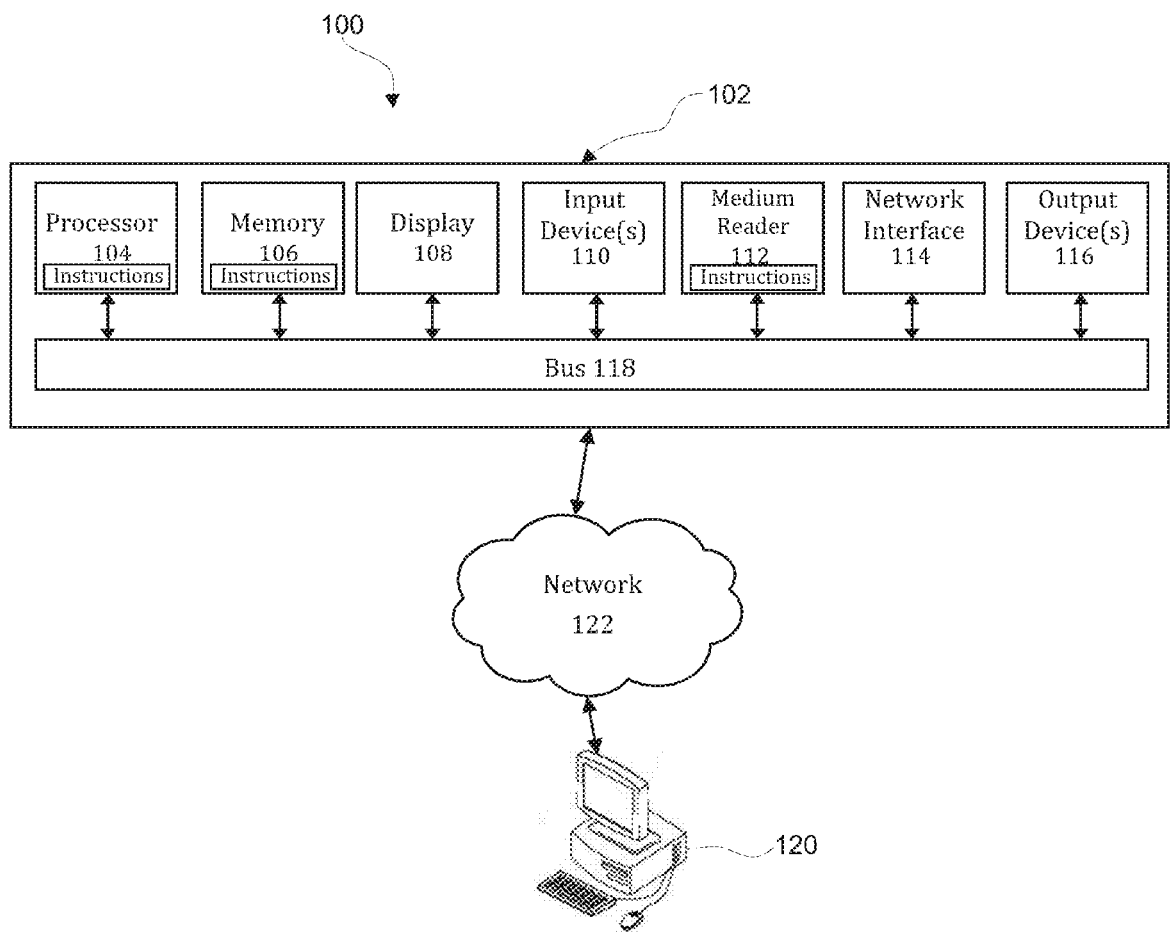
FIG. 1 illustrates an exemplary computer system for managing data analytics.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term non-transitory is to be interpreted not as an eternal characteristic of a state, but as a characteristic of a state that will last for a period of time. The term non-transitory specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term non-transitory is to be interpreted not as an eternal characteristic of a state, but as a characteristic of a state that will last for a period of time. The term non-transitory specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of performing and managing data analytics.

Figure 2:
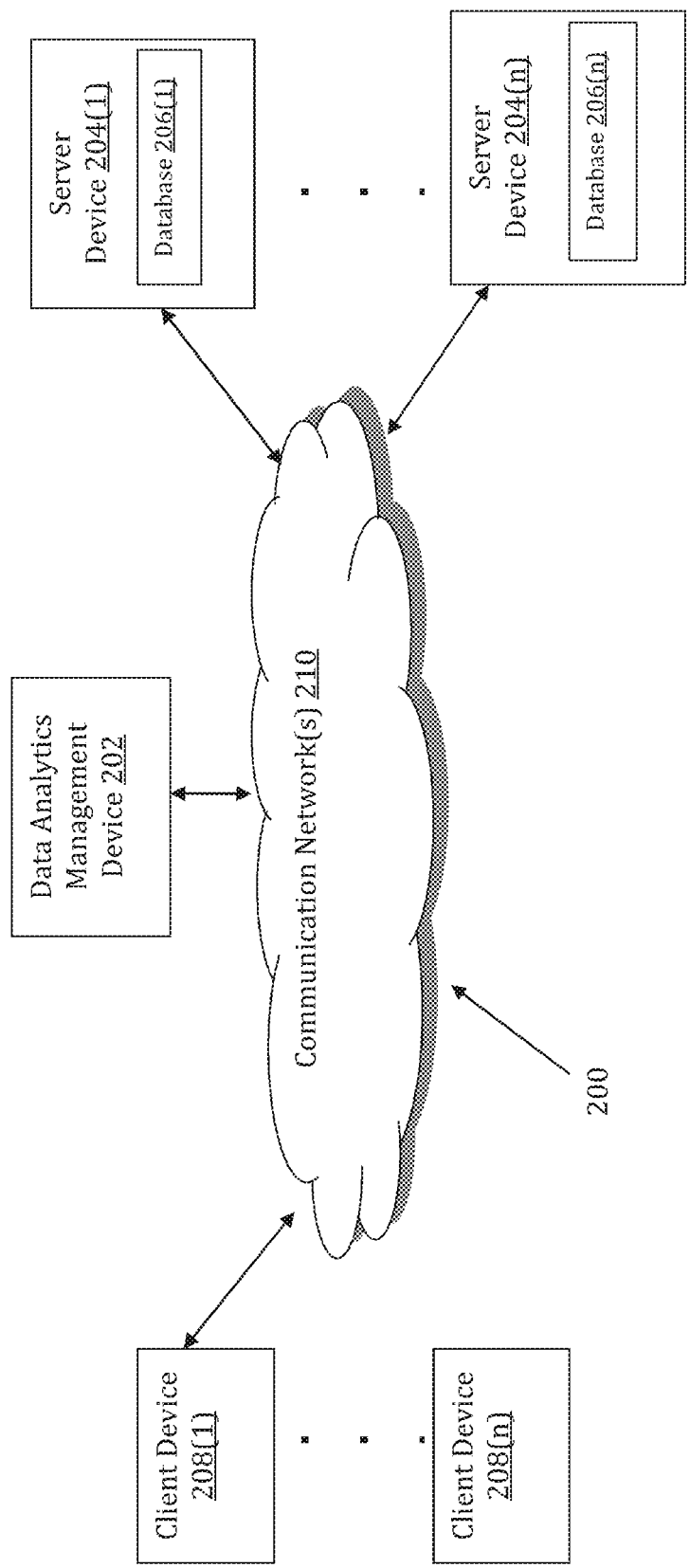
FIG. 2 illustrates an exemplary diagram of a network environment.

Referring to FIG. 2, a schematic of an exemplary network environment 200 for implementing a method for performing and managing data analytics is illustrated. In an exemplary embodiment, the method is executable on any networked computer platform, such as, for example, a desktop personal computer (PC) or a wireless mobile communication device, i.e., a smart phone.

The performing and managing of data analytics may be implemented by a Data Analytics Management (DAM) device 202. The DAM device 202 may be the same or similar to the computer system 102 as described with respect to FIG. 1. The DAM device 202 may store one or more applications that can include executable instructions that, when executed by the DAM device 202, cause the DAM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DAM device 202 itself, may be located in virtual server(s) running in a cloud-based computing environment rather than being tied to one or more specific physical network computing devices. Also, the application(s) may be running in one or more virtual machines (VMs) executing on the DAM device 202. Additionally, in one or more embodiments of this technology, virtual machine(s) running on the DAM device 202 may be managed or supervised by a hypervisor.

In the network environment 200 of FIG. 2, the DAM device 202 is coupled to a plurality of server devices 204(1)-204(n) that hosts a plurality of databases 206(1)-206(n), and also to a plurality of client devices 208(1)-208(n) via communication network(s) 210. A communication interface of the DAM device 202, such as the network interface 114 of the computer system 102 of FIG. 1, operatively couples and communicates between the DAM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DAM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DAM devices that efficiently perform and manage data analytics tasks.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DAM device 202 may be a standalone device or integrated with one or more other devices or apparatuses, such as one or more of the server devices 204(1)-204(n), for example. In one particular example, the DAM device 202 may include or be hosted by one of the server devices 204(1)-204(n), and other arrangements are also possible. Moreover, one or more of the devices of the DAM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DAM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store user preference data, historical user behavior data, merchant-related data, and rules that relate to the web application.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204

(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of a web application. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DAM device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DAM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DAM device 202, the server devices 204(1)-204(n), or the client devices 208(1)-208(n), for example, may be configured to operate as virtual instances on the same physical machine. In other words, one or more of the DAM device 202, the server devices 204(1)-204(n), or the client devices 208(1)-208(n) may operate on the same physical device rather than as separate devices communicating through communication network(s) 210. Additionally, there may be more or fewer DAM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
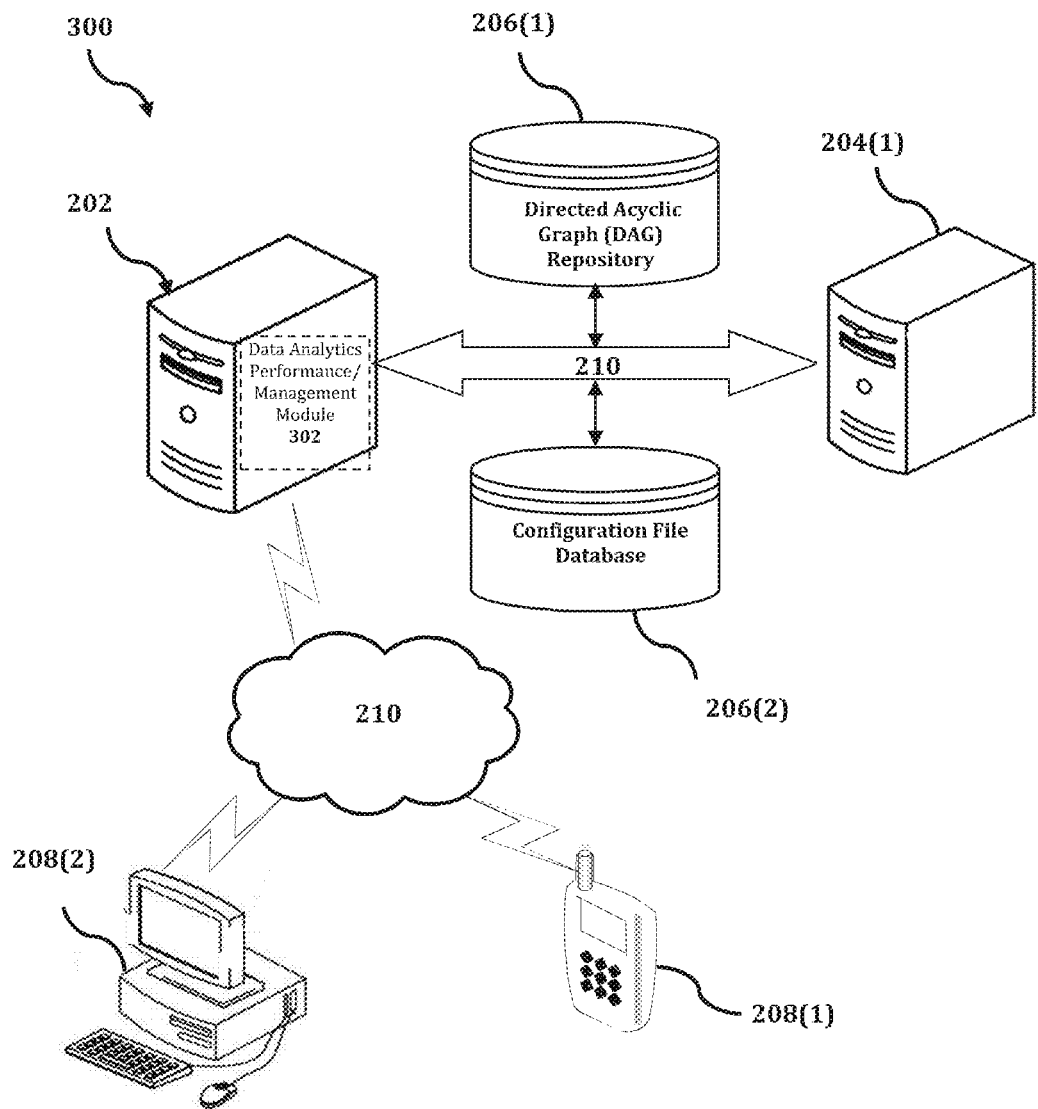
FIG. 3 shows an exemplary system for performing and managing data analytics.

The DAM device 202 is described and shown in FIG. 3 as including a data analytics performance/management module 302, although it may include other rules, policies, modules, databases, or applications, for example. As will be described below, the data analytics performance/management module 302 is configured to perform and manage data analytics tasks in an automated, efficient, scalable, and reliable manner. Based on a configuration file obtained from a user via a client device 208, the data analytics performance/management module 302 determines a sequence of steps that are used to generate a directed acyclic graph (DAG), which is then executed by invoking an application programming interface to apply transformations as defined in the sequence of steps.

An exemplary process 300 for managing data analytics by utilizing the network environment of FIG. 2 is shown as being executed in FIG. 3. Specifically, a first client device 208(1) and a second client device 208(2) are illustrated as being in communication with DAM device 202. In this regard, the first client device 208(1) and the second client device 208(2) may be clients of the DAM device 202 and are described herein as such. Nevertheless, it is to be known and understood that the first client device 208(1) and/or the second client device 208(2) need not necessarily be clients of the DAM device 202, or any entity described in association therewith herein. Any additional or alternative relationship may exist between either or both of the first client device 208(1) and the second client device 208(2) and the DAM device 202, or no relationship may exist.

Further, DAM device 202 is illustrated as being able to access a directed acyclic graph (DAG) repository 206(1) and a configuration file database 206(2). The data analytics performance/management module 302 may be configured to access these databases for implementing a process for performing a data analytics task.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DAM device 202 via broadband or cellular communication. Of course, these embodiments are merely exemplary and are not limiting or exhaustive.

Upon being started, the data analytics performance/management module 302 executes a process for performing a data analytics task. An exemplary process for implementing a method for performing a data analytics task is generally indicated at flowchart 400 in FIG. 4.

Figure 4:
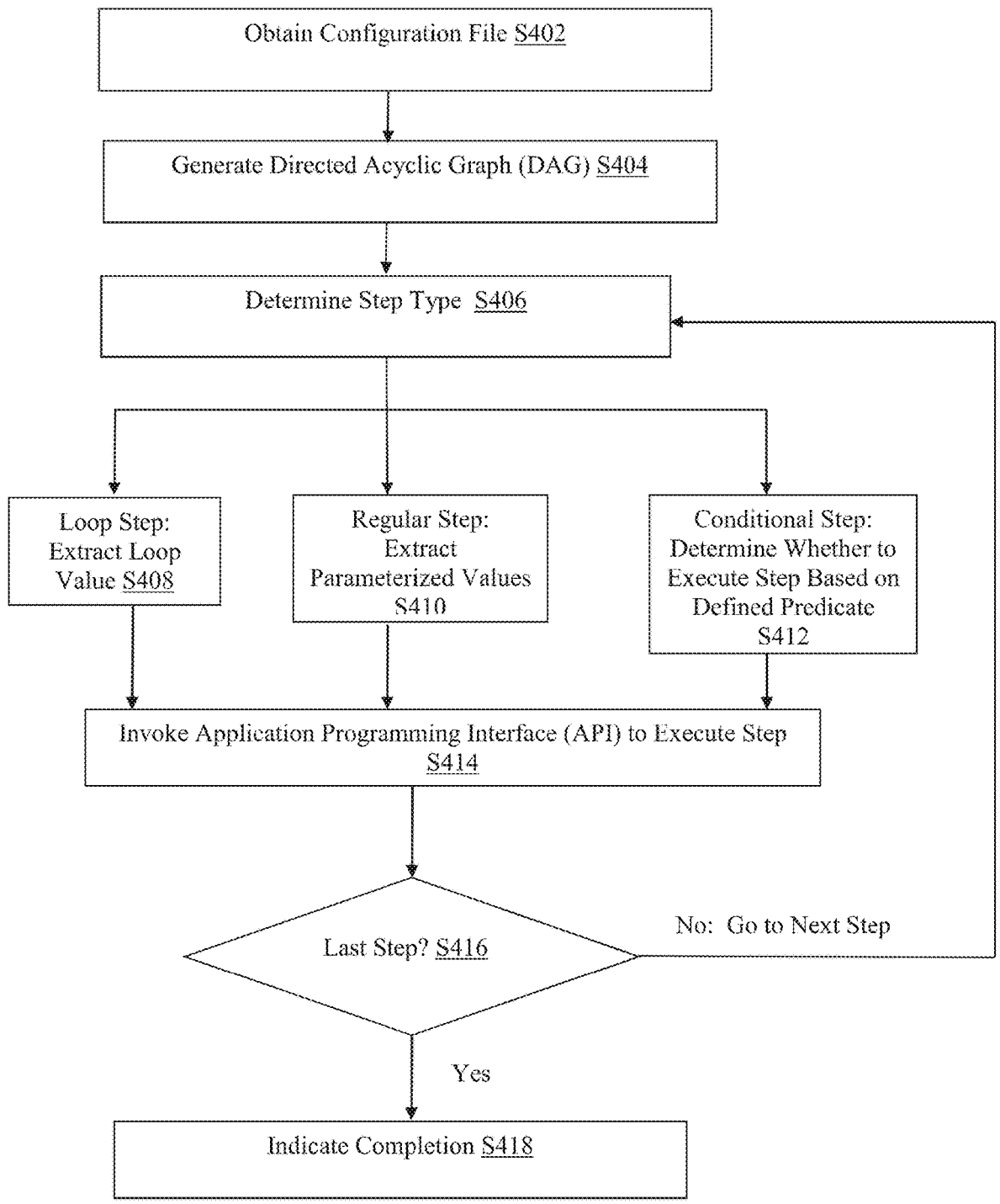
FIG. 4 is a flowchart of an exemplary process for performing and managing data analytics.

In the process 400 of FIG. 4, in operation S402, a configuration file is obtained. The configuration file includes steps that have attributes or parameters that identify sources of input data, transformations to be applied to the input data, and/or sinks of output data that results from the applications of the transformations. The transformations correspond to business logic and may, for example, be encapsulated in a separate file located in the memory or on one of the server devices. Each step may also include one or more dependencies with respect to other steps. In an exemplary embodiment, the configuration file is received from a user via a client device 208.

In some exemplary embodiments, the data may be sourced from, and/or persisted to, any one of an Apache Hadoop Distributed File System (HDFS), Apache Hive, Apache HBase, a Relational Database Management System (RDBMS), or another step, although other types of sources and/or sinks may also be used. Transformations may be applied with SQL, JAVA, and/or Scala, for example, although other languages may also be used. In addition, other advanced features may be facilitated in one or more of the steps, such as, for example, caching, partitioning, Structured Query Language user-defined functions (SQL UDF), looping, parameterization, data versioning and/or dependency.

Referring also to FIG. 5, an example of an Apache Spark source code fragment that includes boilerplate code and a corresponding configuration file is illustrated. The configuration file, when processed by the data analytics performance/management module, provides the same functionality and results as would be produced by executing the boilerplate source code fragment. The configuration file illustrated in FIG. 4 defines two steps, the second of which is dependent on the first, although any number of steps and dependencies may be used.

Figure 6:
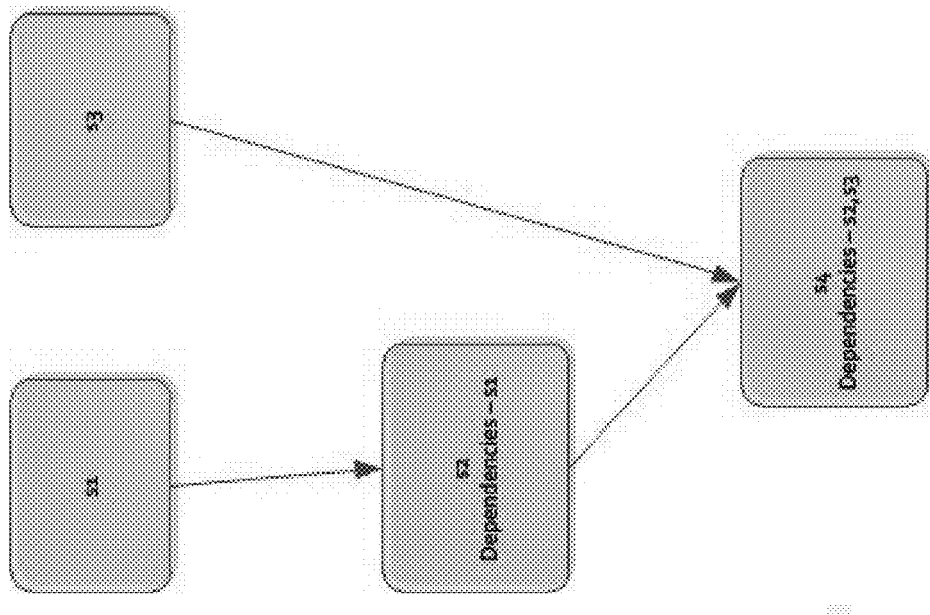
FIG. 6 illustrates a configuration file and a corresponding directed acyclic graph (DAG) that is generated based on the process of FIG. 4, according to an exemplary embodiment.

Referring again to FIG. 4, in operation S404, the data analytics performance/management module interprets the configuration file to generate a directed acyclic graph (DAG) based on the steps defined in the obtained configuration file. Referring also to FIG. 6, an exemplary configuration file that includes four steps and a corresponding DAG is illustrated. In this example, step S2 is dependent on step S1 and step S4 is dependent on steps S2 and S3. In an exemplary embodiment, the sequence of steps may be lengthy and/or complex, and the DAG may effectively represent a complex dependency pipeline of steps.

Referring again to FIG. 4, in operation S406, the data analytics performance/management module determines a type of the current step. In an exemplary embodiment, the step type may include a regular step, a conditional step, and/or a loop step, although other types of steps may also be used.

When a determination is made that the step type is a loop step, the process 400 proceeds to operation S408. In operation S408, the data analytics performance/management module extracts a loop value from either the current step or the previous step of the configuration file.

When a determination is made that the step type is a regular step, the process 400 proceeds to operation S410. In operation S410, the data analytics performance/management module extracts parameterized values from the current step of configuration file. The parameterized values may be associated with the particular parameters or attributes for the step that are defined in the configuration file. Accordingly, the values may include indications of sources, sinks, or types of transformations, for example, although other types of parameterized values may also be extracted in operation S410.

When a determination is made that the step type is a conditional step, the process 400 proceeds to operation S412. In operation S412, the data analytics performance/management module determines whether the step should be executed based on a defined predicate that corresponds to the current step.

In operation S414, the data analytics performance/management module invokes an application programming interface (API) of the DAM device 202 in order to execute the transformations included in the current step.

In operation S416, the data analytics performance/management module determines whether the current step is the last step. If a determination is made that the current step is not the last step, the process 400 returns to operation S406 and repeats the subsequent operations with respect to the next step of the configuration file.

When the last step has been executed, the process 400 proceeds to operation S418. In operation S418, the data analytics performance/management module transmits an indication that the performance of the data analytics task has been completed. In an exemplary embodiment, the indication of completion may be transmitted to a source of the configuration file, such as, for example, the client device 208 from which the configuration file was received. The indication of completion may include, for example, an indication of successful completion or an error code that indicates that an error has occurred.

In an exemplary embodiment, by implementing this technology, data analytics tasks may be orchestrated and pipelined more effectively without requiring significant reproduction of standard or boilerplate source code, thereby increasing the available resources for generating and testing business logic. This technology also facilitates faster development, reduced unit testing, reduced code changes required to facilitate upgrades, and improved performance and stability of the data analytics platform.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term computer-readable medium includes a single medium or multiple media, such as a centralized or distributed database, and/or associated caches and servers that store one or more sets of instructions. The term computer-readable medium shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term invention merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing a data analytics task, the method being implemented by at least one data analytics device, the method comprising:
   obtaining a configuration file comprising a plurality of steps, each step comprising at least one parameter that identifies at least one from among at least one source of input data, at least one transformation to be applied to the input data, and at least one sink of output data resulting from an application of the at least one transformation to the input data, wherein the at least one transformation corresponds to a predetermined set of business logic, and wherein at least a second step from among the plurality of steps depends from at least a first step from among the plurality of steps;
   using the configuration file to generate a directed acyclic graph (DAG) based on the plurality of steps; and
   executing the DAG by invoking an application programming interface (API) of the at least one data analytics device to apply the at least one transformation to the input data, and returning an indication of completion to a source of the configuration file.

2. The method of claim 1, wherein the at least one source of the input data includes at least one from among an Apache Hadoop Distributed File System (HDFS), an Apache Hive data warehouse, and an Apache HBase.

3. The method of claim 1, wherein the at least one sink of the output data includes at least one from among an Apache Hadoop Distributed File System (HDFS), an Apache Hive data warehouse, and an Apache HBase.

4. The method of claim 1, wherein the at least one transformation includes at least one from among a transformation applied with Structured Query Language, a transformation applied with Java, and a transformation applied with Scala.

5. The method of claim 1, wherein at least one from among the plurality of steps includes at least one feature from among a plurality of features consisting of caching, partitioning, a Structured Query Language user-defined function (SQL UDF), looping, parameterizing, data versioning, and dependency.

6. The method of claim 1, wherein the executing the DAG comprises determining, for a particular step among the plurality of steps, a step type, wherein the step type includes at least one from among a regular step, a conditional step, and a loop step.

7. The method of claim 6, wherein when the particular step is determined to be a regular step, the executing the DAG further comprises extracting at least one parameterized value from a portion of the configuration file that corresponds to the particular step.

8. The method of claim 6, wherein when the particular step is determined to be a conditional step, the executing the DAG further comprises determining whether the particular step is to be executed based on a defined predicate that is included in a portion of the configuration file that corresponds to the particular step.

9. The method of claim 6, wherein when the particular step is determined to be a loop step, the executing the DAG further comprises extracting at least one loop value from a portion of the configuration file that corresponds to the particular step.

10. The method of claim 6, wherein when the particular step is determined to be a loop step, the executing the DAG further comprises extracting at least one loop value from a portion of the configuration file that corresponds to a step that immediately precedes the particular step.

11. A device configured to implement an execution of a method for performing a data analytics task, the device comprising:
a processor;
a memory; and
a communication interface coupled to each of the processor and the memory,
wherein the processor is configured to:
obtain a configuration file comprising a plurality of steps, each step comprising at least one parameter that identifies at least one from among at least one source of input data, at least one transformation to be applied to the input data, and at least one sink of output data resulting from an application of the at least one transformation to the input data, wherein the at least one transformation corresponds to a predetermined set of business logic, and wherein at least a second step from among the plurality of steps depends from at least a first step from among the plurality of steps;
use the configuration file to generate a directed acyclic graph (DAG) based on the plurality of steps; and
execute the DAG by invoking an application programming interface (API) of the device to apply the at least one transformation to the input data, and returning an indication of completion to a source of the configuration file.

12. The device of claim 11, wherein the at least one source of the input data includes at least one from among an Apache Hadoop Distributed File System (HDFS), an Apache Hive data warehouse, and an Apache HBase.

13. The device of claim 11, wherein the at least one sink of the output data includes at least one from among an Apache Hadoop Distributed File System (HDFS), an Apache Hive data warehouse, and an Apache HBase.

14. The device of claim 11, wherein the at least one transformation includes at least one from among a transformation applied with Structured Query Language, a transformation applied with Java, and a transformation applied with Scala.

15. The device of claim 11, wherein at least one from among the plurality of steps includes at least one feature from among a plurality of features consisting of caching, partitioning, a Structured Query Language user-defined function (SQL UDF), looping, parameterizing, data versioning, and dependency.

16. The device of claim 11, wherein the processor is further configured to execute the DAG by determining, for a particular step among the plurality of steps, a step type, wherein the step type includes at least one from among a regular step, a conditional step, and a loop step.

17. The device of claim 16, wherein when the particular step is determined to be a regular step, the processor is further configured to extract at least one parameterized value from a portion of the configuration file that corresponds to the particular step.

18. The device of claim 16, wherein when the particular step is determined to be a conditional step, the processor is further configured to determine whether the particular step is to be executed based on a defined predicate that is included in a portion of the configuration file that corresponds to the particular step.

19. The device of claim 16, wherein when the particular step is determined to be a loop step, the processor is further configured to extract at least one loop value from a portion of the configuration file that corresponds to the particular step.

20. The device of claim 16, wherein when the particular step is determined to be a loop step, the processor is further configured to extract at least one loop value from a portion of the configuration file that corresponds to a step that immediately precedes the particular step.

* * * * *